(12) United States Patent
Stooke (10) Patent No.: US 9,014,551 B1
(45) Date of Patent: Apr. 21, 2015

(54) METHOD AND APPARATUS FOR SIMULATING A PHOTON-COUNTING DETECTOR ARRAY AS USED IN A COMMUNICATION LINK

(71) Applicant: The United States of America as Represented by the Secretary of the Air Force, Washington, DC (US)

(72) Inventor: Adam M. Stooke, O'Fallon, IL (US)

(73) Assignee: The United States of America as Represented by the Secretary of the Air Force, Washington, DC (US)

( * ) Notice: Subject to any disclaimer, the term of this patent is extended or adjusted under 35 U.S.C. 154(b) by 195 days.

(21) Appl. No.: 13/799,417

(22) Filed: Mar. 13, 2013

(51) Int. Cl.
*H04B 10/70* (2013.01)
*H04L 9/08* (2006.01)
*H04B 10/00* (2013.01)
*H04B 10/07* (2013.01)

(52) U.S. Cl.
CPC ...................................... *H04B 10/07* (2013.01)

(58) Field of Classification Search
USPC ....................................................... 398/16, 9
See application file for complete search history.

(56) References Cited

U.S. PATENT DOCUMENTS

2007/0120062 A1* 5/2007 Li et al. .................... 250/370.09

OTHER PUBLICATIONS

Hopman ["An End-To-End Demonstration of a Receiver Array Based Free-Space Photon Counting Communication Link" Proc. of SPIE vol. 6304].*
Vacheret ["Characterization and Simulation of the Response of Multi Pixel Photon Counters to Low Light Levels" Nucl. Instr. and Meth in Phys. Res. A].*
Glettler, J.B. et al, "InP-based Single-Photon Detector Arrays With Asynchronous Readout Integrated Circuits", Optical Engineering, 0001;47(10):10502, Oct. 2008.
Frechette, Jonathan, "Readout Circuitry for Continuous High-Rate Photon Detection With Arrays of InP Geiger-Mode Avalanche Photodiodes", Proceedings SPIE 8375, May 2012.

* cited by examiner

*Primary Examiner* — Oommen Jacob
(74) *Attorney, Agent, or Firm* — James M. Skorich (57) ABSTRACT

The method and apparatus as disclosed herein allows the user to input conditions for a communications link, set characteristic values of a photon-counting detector array, simulate the resulting link, observe a summary analysis of the simulated detector and link activity, and extract a record of the detector activity (e.g. each photon counted) making it available for further analysis.

1 Claim, 4 Drawing Sheets

METHOD AND APPARATUS FOR SIMULATING A PHOTON-COUNTING DETECTOR ARRAY AS USED IN A COMMUNICATION LINK

The conditions under which this invention was made are such as to entitle the Government of the United States under paragraph I(a) of Executive Order 10096, as represented by the Secretary of the Air Force, to the entire right, title and interest therein, including foreign rights.

FIELD OF THE DISCLOSURE

The purpose of the disclosure is to model and explicitly simulate the behavior of a photon-counting detector array as used in an optical communication link. The intent is to support complete analysis and understanding of the effects of the detector array and related firmware/software on the communication system's performance under any static (or non-changing) communication link conditions.

BACKGROUND

No explicit time-domain simulation of the behavior of a photon-counting detector array as used in a communications link is known to exist. Instead, efforts to predict detector array behavior (and hence overall communication link performance) have relied on time-average approximations for modeling some features (e.g. blocking loss) of the detector array and have simply ignored other features (e.g. crosstalk). Furthermore, previous efforts have relied on array-average values rather than an accounting of the independent behavior of individual pixels within the array. Together, these approximations and omissions result in error in predictions of the detector array behavior and system performance. Although that error is small enough to permit confident construction of an experimental system, it is large enough to prevent complete quantitative understanding of the detector array behavior and its implications for the communication system.

SUMMARY

An embodiment disclosed herein is directed toward a method for analyzing a communications link comprising: receiving a plurality of input conditions for the communications link and a photon-counting detector; preparing stimulus values for the photon-counting detector; running a simulation of the communications link and the photon-counting detector in reaction to the stimulus; decoding the results of the simulation and preparing an analysis of the photon-counting detector activity; and outputting the analysis of the photon-counting detector activity.

Another embodiment disclosed herein is a non-transitory computer-readable medium that stores therein a program causing a controller of a computer device to execute a process to analyze a communications link comprising: receiving a plurality of input conditions for the communications link and a photon-counting detector; preparing stimulus values for the photon-counting detector; running a simulation of the communications link and the photon-counting detector in reaction to the stimulus; decoding the results of the simulation and preparing an analysis of the photon-counting detector activity; and outputting the analysis of the photon-counting detector activity.

Other aspects and advantages of the embodiments will become apparent from the following detailed description, taken in conjunction with the accompanying drawings, and illustrating by way of example the principles of the embodiments.

DETAILED DESCRIPTION

The Air Force Photon-Counting Communication Simulator, Static ("AFPCS") as disclosed herein is a tool and method that allows the user to set conditions for a communications link, set characteristic values of a photon-counting detector array, simulate the resulting link, observe a summary analysis of the simulated detector and link activity, and extract a record of the detector activity (e.g. each photon counted), making it available for further analysis external to this tool. AFPCS may be implemented using MATLAB@ from TheMathWorks, Incorporated of Natwick, Mass. operating on a central server in a MATLAB® environment.

Sections 1 through 5 of this disclosure are introductory explanations of how to interact with the AFPCS, the models AFPCS is based upon, the detector simulation method, and the overall simulation code structure. Sections 6 through 10 are thorough explanations corresponding to the components of the code structure shown in the simulation procedure discussed in Section 5. Finally, section 11 describes an important capability of AFPCS that is explained using the knowledge disclosed in sections 1 through 5.

1. Basic Use

The user may interact with the program using a graphical user interface (GUI). The user may input options through typical GUI elements, such as checkboxes for "yes/no" selections and edit boxes for inputting custom values. Some options are only available or required when certain other options are selected, and this is made clear by automatically enabling or disabling (i.e. greying-out and making non-interactive) the dependent GUI elements as appropriate. Once all values are set, the simulation may be run.

When the simulation is complete, a built-in set of detector and link activity summary values are displayed within the GUI, revealing the basic results of the link. The disclosed embodiment produces graphical depictions of the detector array's activity (e.g. photon count rate by pixel) recorded during the simulation. Furthermore, a complete list of settings and simulation result values are organized and saved, key results are presented on the screen, and raw data outputs are saved to files. Taken together, the outputs aim to provide a complete understanding of the detector array's role in the communication link.

2. Detector Model

The detector model consists of an array of independent pixels, each of which will "trigger" when stimulated. When this occurs, the time at which the trigger happened is recorded to a master list of all trigger events. Later, this master list is used to determine what the communicated message was, as will be explained below in Section 9. Pixels can trigger as a result of at least five different causes: 1) signal photon absorption—this is how the signal is received, by counting each photon (the remaining causes are all noise); 2) background photon absorption—stray light absorbed by pixel; 3) dark count—a spontaneous trigger that happens at a random time; 4) afterpulse—a spontaneous trigger that happens shortly after a pixel is "activated", or made ready to detect light; and 5) crosstalk—caused by an adjacent pixel triggering. Unlike a physical system, in which the cause of each trigger event is unknown, the simulation records the cause of each trigger event. The simulation therefore measures the effects of the noise factors individually even when multiple noise factors are present.

After a pixel triggers, it is turned inactive for a designated period of time before being reactivated. Only after reactivation can the pixel trigger a second time. In a physical system, the purpose of the inactive period after a pixel trigger is to prevent an afterpulse from occurring—the longer the waiting period, the less likely it is that an afterpulse will occur. While inactive, a pixel will not trigger for any reason. As a result, inactive pixels fail to count incident signal photons, and the effect of losing the signal that falls on inactive pixels is called "blocking loss". In a physical system, these photons are not counted and therefore remain unknown, but the simulation records when a photon is lost in this way. Thus, the simulation measures both the signal detected by the array and the signal incident on the array. The relation between these two values is an important factor in overall system performance.

3. Communication Model

In addition to the photon-counting detector array, the signal modulation format is modeled, as well. The modulation format is essentially the scheme used to encode data bits into the light signal transmitted to the detector array. The same modulation format is known to the receiver and is used to interpret the signal, or the master list of trigger events, after detection for conversion back to bits. Modulation formats included are based on light-intensity modulation in time, wherein the arrival times of brief pulses of light is what encodes the intended message bits.

It is informative to have an example modulation format in mind when considering the embodiments of this disclosure. "Pulse-position modulation" is a good example and is a commonly-known communication method. In pulse-position modulation, time is divided into adjacent, non-overlapping windows, and multiple windows are group together into a "symbol." During each symbol, exactly one time window will contain a signal light pulse. Knowledge of which time window contains the signal reveals the intended message, which is usually in the form of bits. For example, if four time windows, numbered 1 through 4, comprise a symbol, then a pulse during window 1 could convey the bits "00", window 2 could convey "01", window 3 could convey "10", and window 4 could convey "11". A long series of pulses, then, could be used to transmit many data bits in sequence. A challenge for the communication link engineer using pulse-position modulation is to design a system that transmits adequate signals to the receiver for it to correctly determine the window in which each signal pulse appears. Often, false signals from the environment, or noise in the link, produce the appearance of signal in incorrect windows. The AFPCS 100 helps the communications engineer to explore specific, realistic signal and noise conditions and determine link viability.

4. Detector Simulation Basics

The modulation formats simulate all divide time into designated windows; no distinction is made between trigger events occurring at two different times within one window. Therefore, it is convenient to simulate time discretely in adjacent, non-overlapping time "slots". The detector array dynamics are tracked on a slot-by-slot basis, so that each pixel may only experience one trigger event per slot. The duration of the simulation time slot is set to match that of the modulation format's time window for convenience. It is possible to simulate detector array dynamics on as fast a time scale as desired by setting the simulation's slot duration to be shorter than the protocol's time window, but this will not generally be considered to be the typical case herein.

The detector simulation proceeds by tracking the status of each pixel through time, slot after slot, sequentially from beginning to end. At a given time slot, the simulation reactivates any pixels due for activation and executes any trigger events for that slot. Trigger event execution includes the following actions: 1) recording that a trigger occurred during said slot; 2) recording the cause of the trigger; 3) recording which pixel triggered; 4) setting the pixel status to "inactive"; 5) determining when the pixel will be reactivated; and 6) determining (by a random number) how long after reactivation the pixel will spontaneously trigger (if it is not triggered again before then). The simulation tracks signal photon absorptions into inactive pixels, although these absorptions do not cause trigger events. The main results of the detector simulation are a master list of all count events, component lists of the counts due to each cause, and a record of the total number of counts by each pixel (both all together and by cause).

5. Simulation Procedure Overview

Figure 1:
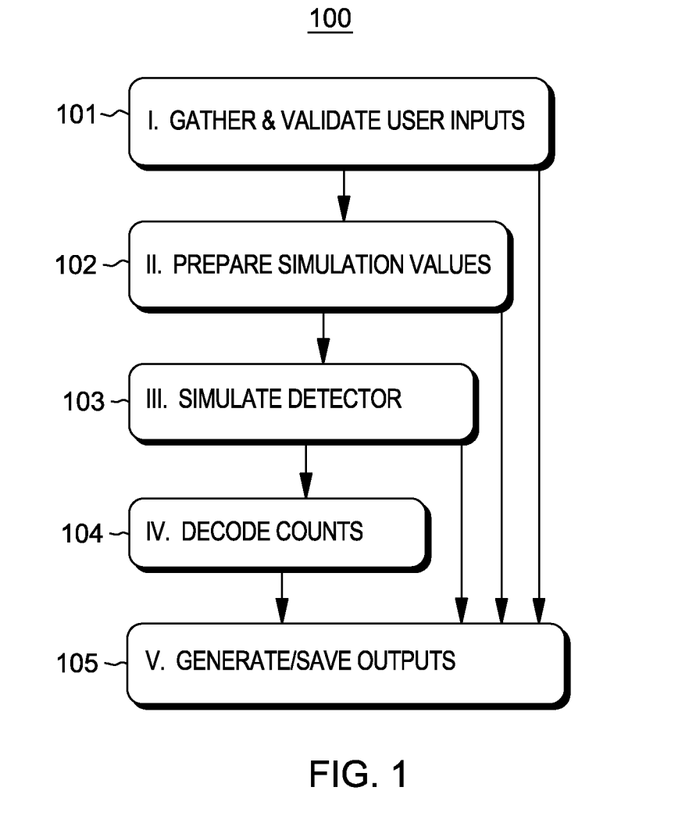
FIG. 1 is a flow diagram illustrating steps performed in operation of the AFPCS 100.

The detector simulation is only one of five major steps executed in sequence when the user commands AFPCS 100 to run a simulation, as illustrated in FIG. 1. In a first step 101, AFPCS 100 gathers and validates user inputs. All the values set or input into the GUI are captured and are checked for range and type. Any input that is not allowed (e.g. a negative number for a field that must contain a positive number) will cause the simulation to cease, and AFPCS 100 will provide notification of the error and its nature.

Once all the inputs are accepted, AFPCS 100 uses them in the second step 102 to prepare the values needed for the simulation. All values representing or quantifying any stimulus to the detector array during the upcoming simulation are produced at this step 102, prior to the start of the detector simulation. Examples include the exact number, timing, and location of all signal photons to be absorbed by the array. Production of these values beforehand permits AFPCS 100 to execute the overall simulation much faster than if they were produced one at a time as needed during the detector simulation.

The third step 103 of the simulation procedure is the detector simulation, which is the heart of the entire program. The detector's reaction in time to all the prepared stimuli is simulated and recorded.

Once the detector simulation is complete, step four 104 occurs, wherein the master list of all detector counts is used (as would be the case in a physical system) to determine the received message bits. Comparison of this result against the intended message bits provides a measure of communication fidelity—the bottom line in link performance.

Finally, in step five 105, AFPCS 100 generates statistical measures of the detector's activity. It uses those measures and values from all the previous steps to produce all outputs that can be witnessed as the results of the simulation. This step 105 concludes the simulation procedure, and AFPCS 100 is then ready to accept new inputs and run again.

Each of the five steps 101 through 105 may be carried out by a distinct module (or modules) of computer code as directed by an overall simulation management code. Some of the steps contain modules, and some of those are interchangeable, providing flexibility in simulation execution. The next five sections 6 through 10 describe the details of each of the five steps 101 through 105 more thoroughly.

6. Simulation Inputs (First Step 101)

Simulation inputs may include photon-counting detector qualities of the photon-counting detector, a communication protocol, and communication link conditions. Nearly every quantified simulation parameter may be specified. The simulation settings may be organized into four categories: "array", "communication", "link", and "spot". The following paragraphs list the inputs under each category, although the meaning of some inputs may be better understood after reading further sections.

Array values may include: 1) array size (number of pixels); 2) dark count rate (parameter used in generating the random times before spontaneous triggers); 3) minimum time to wait after a trigger before pixel reactivation; 4) frequency of pixel reactivation events (reactivations may be limited to occur only periodically rather than during any slot, mimicking the real device wherein a pixel reactivation voltage pulse is simultaneously sent to the entire array at regular intervals); 5) probability of afterpulse trigger; 6) afterpulse characteristic time; 7) probability of crosstalk trigger; 8) designated pixels to keep permanently inactive (it is possible to use less than the full array to detect incoming light); and 9) relative sensitivity to light of each pixel (likely not perfectly uniform in a real device).

Communication values may include: 1) bit source—random or from file; 2) modulation format—built-in options or user-written function; 3) forward error correction (extra pre-processing of data bits before transmission and extra post-processing of received signal to improve transmission fidelity)—which can be optional; 4) data repeat factor (number of times each signal pulse is repeated in a row to boost reception); and 5) slot duration (with modulation format, it may set the simulated data rate).

Link values may include: 1) incident signal level; 2) signal photon number distribution—built-in options or user-written functions; 3) incident background level; 4) background photon number distribution—built-in options or user-written function; 5) signal pulse spillover amounts—portion of signal photons to occur in the protocol time window ahead of or behind the intended time window (simulates constant timing error).

The spot values all contribute to generating the probability distribution function describing where on the array the signal photons will land. A prepared distribution may be loaded or one of the three built-in options may be used to generate a new one: 1) uniform; 2) Airy distribution—with adjustable size, symmetry, and position, and can include aperture obscuration; or 3) propagation code-set parameters of aperture size, focus length, wavelength, pixel size, obscuration size, defocus (of detector position), and import an incident signal light wavefront (amplitude and/or phase) if desired, to run a Fourier transform-based optical system propagation code to produce the resulting signal light intensity distribution on (and off) the detector.

Many input settings require a number input and inputs containing more than one value are allowed. Multiple values for these inputs may be listed, input only once to run, and the program will automatically run each input scenario in sequence (by repeating steps 102 to 105 for each input scenario).

7. Detector Simulation Values Preparation (Second Step 102)

The second step 102 in the overall simulation is to use the inputs to produce all the values needed to run the detector simulation. These values fall into two general categories: deterministic and random. A few examples of the deterministic values are explained before moving on to the random values, which require a more detailed description.

One example of a deterministic value to be prepared is the initial status of every pixel in the array, as selected pixels may have been selected to remain permanently inactive. In another example, the selected data bits must be encoded into the signaling format, which determines when each signal pulse will occur. Some input values need merely to be converted into units usable in the simulation. For example, AFPCS 100 accepts input for the time between reset events in units of microseconds, and during value preparation this is converted to units of time slots, the unit of timekeeping in the detector simulation.

An important random value is the number of signal photon absorptions to occur during each time window with a signal light pulse. In a real system, the exact number of photons that get absorbed is a truly random value that varies from pulse to pulse, even when the average value remains constant. That random value is typically modeled by the Poisson distribution, which tells the likelihood of measuring each possible number of photons given the average number. For example, when the average is 3.2, the Poisson distribution tells that there is a 4% chance for measuring 0 photons, a 13% chance for 1, a 21% chance for 2, a 22% chance for 3, an 18% chance for 4, an 11% chance for 5, and so on. The fact that the exact number of signal photons absorbed varies even when the signal strength is not varying (is static) is an important factor for signal decoding (of the master list of counts). AFPCS 100 accounts for this phenomenon and provides the flexibility to model the number of signal photons using any arbitrary discrete probability distribution function.

Another important example of a random number that AFPCS 100 generates and uses is the pixel within the array at which each photon is absorbed. In a real system, the distribution of signal light on the detector array, or the brightness pattern, depends on the arrangement of the receiver (i.e. telescope, lenses, mirrors, etc.) that focuses light onto the relatively small area of the detector. Should the telescope be pointed slightly away from the direction of the incident signal light, for instance, the light distribution on the detector will translate to the side. The brightness pattern also depends on the shape of the wavefront that is incident upon the receiver. For example, a light wave emitted by a laser has a smooth wavefront, so a telescope can easily focus it to a small spot. But after propagating through the atmosphere, that light wave may have a jagged wavefront, causing a telescope to produce a splotchy, spread-out focal spot. Lastly, the position of the detector array along the direction of light propagation can be used to alter the light distribution on the detector. The further the detector is away from the focus position of the optical system, the wider the distribution of light is on the detector. AFPCS 100 models all of these effects using the commonly-known method of the Fourier transform of the amplitude and phase of light in the telescope aperture (with planar and parabolic phase distortion as models for telescope pointing error and detector defocus, respectively). The relevant parameter values may be set and produce realistic signal spot patterns for use in simulation, including spots that do not lie entirely on the detector array. Alternatively, any arbitrary signal spot pattern may be provided to the simulation. In any case, AFPCS 100 randomly distributes signal photons according to the chosen distribution on the array, as would happen in reality. The blocking losses resulting from any spot shape may be analyzed (e.g. focusing too much signal light onto one pixel will cause much of that signal to be blocked). Furthermore, the effects of the non-uniformity in detector array sensitivity may be studied by simulating the spot in different positions on an array, since AFPCS 100 automatically adjusts the apparent signal level by the specific pixel sensitivity.

Other random values of interest may include the following: 1) the amount of time after being reactivated before a pixel will spontaneously trigger (dark counts are modeled by a negative exponential distribution); 2) whether or not an afterpulse will occur when a pixel is reactivated; 3) whether or not a pixel trigger will cause an adjacent pixel to trigger (i.e., crosstalk); 4) the number of background photons absorbed during each time slot; and 5) the pixel at which each background photon is absorbed.

The computer code that produces the values needed for the simulation is ideally modular. For example, the code that enforces symbol spillover (i.e. signal photons occurring outside of the intended time windows) may be separate from the signal modulation code, so any modulated train of intended signal pulses (with photons in designated slots) can be modified in the same way. In another example, the code block called to encode the data bits into signal pulses is the one that corresponds to the chosen communication protocol. During that encoding process, a separately selectable code block is called upon to produce the actual number of photons present in each pulse. Such modularity as in the last example allows the user to expand functionality of AFPCS 100 by writing custom code into a MATLAB ".m file" (function) and specifying its use. This is true for the following preparation operations: 1) forward error correction encoding (of the data bits); 2) forward error correction decoding; 3) encoding of bits into signal pulses; 4) basic received signal-to-bits demodulation; 5) signal photon number distribution (pulse by pulse); and 6) background photon number distribution (slot by slot). The flexibility in preparing the detector stimuli is intended to extend AFPCS 100's ability to simulate communication conditions beyond the built-in options.

8. Detector Simulation Method (Third Step 103)

The third step 103 in the simulation is to simulate the detector's reaction to all the stimuli prepared in step two 102. The wide flexibility in simulation value preparation is permitted by the fact that the detector simulation runs on a slot by slot basis and is ignorant of any intention behind or connection between any of the detector stimuli. Although the concept of running the simulation time slot by time slot as described in Section 4 is straightforward, the speed of the simulation is significantly enhanced by the use of a specially developed method, as described herein.

Figure 2:
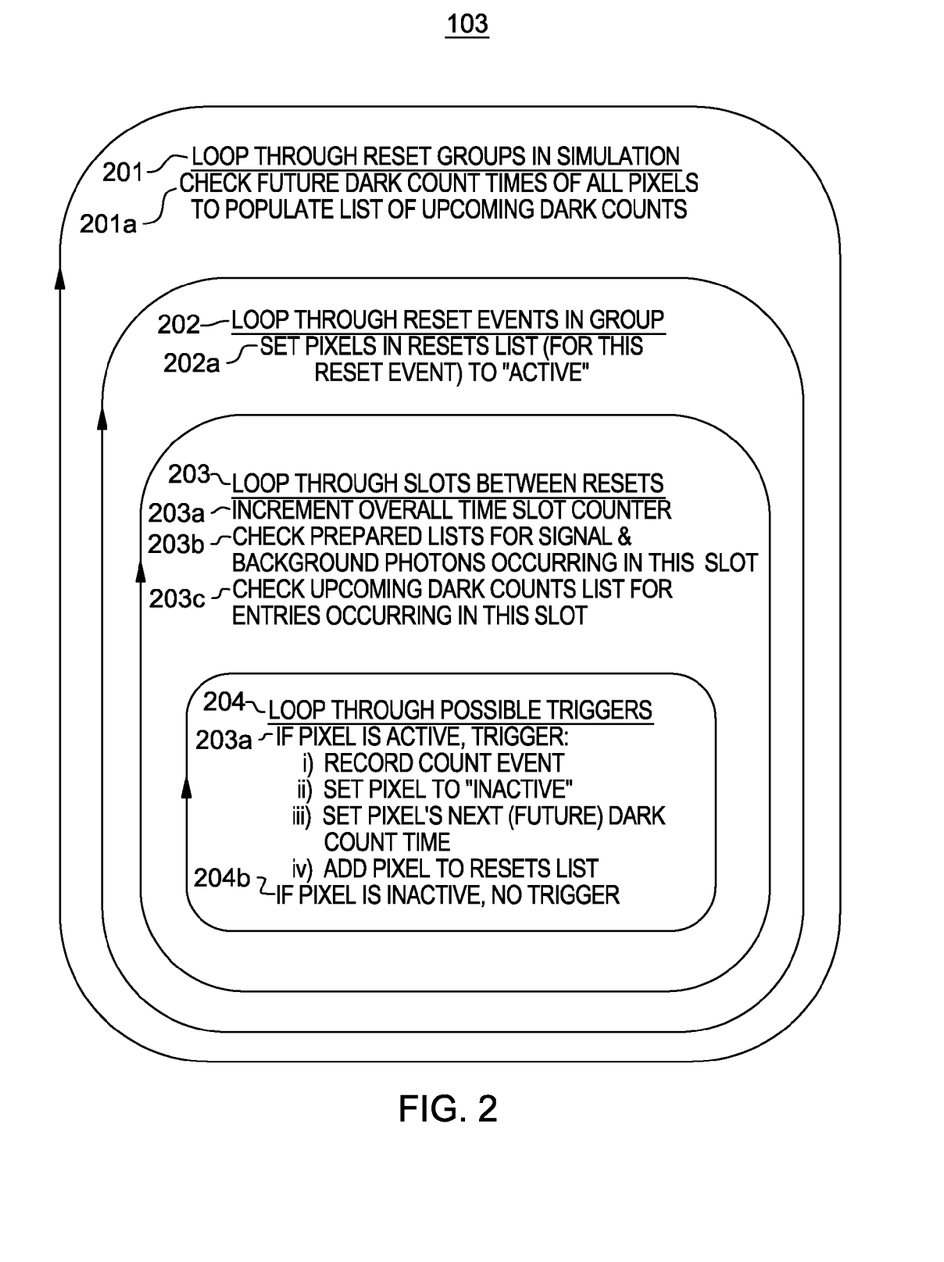
FIG. 2 is a diagram of the loop structure of step 3 performed in the detector simulation.

As illustrated by the loop structure in FIG. 2, the third step 103 comprises a series of nested loops in a way that minimizes the total number of operations that AFPCS 100 requires the computer to run. From outer loop to the inner loop, they are: loop through all the "reset groups", defined below, in the simulation (loop 201); loop through all reset events that occur during a reset group (loop 202); loop through all the slots that occur between two reset events (loop 203); and loop through all the possible trigger events in a slot (loop 204). The reasoning for the loop structure as portrayed in FIG. 2 is described next.

The time slot at which each pixel will experience a dark count (if it does not trigger for another reason before then) is tracked throughout the simulation. Each time a pixel triggers, it receives a new time to experience a dark count after its ensuing reactivation (from a list of prepared values) 204*a*(iii). The detector simulation code must check the value telling when the dark count will occur 201*a*, 203*c* and execute a dark count for pixels whose time matches the current slot of the simulation 203*c* through 204. Relative to checking every pixel at every time slot, the total number of comparison operations that the program performs is reduced by checking the entire array only periodically for upcoming dark counts. A fixed reference list is prepared for dark count execution during the ensuing time slots 201*a*.

The array must be checked often enough so that any new dark count time that was assigned since the last check cannot result in a dark count happening before the next check, or else some dark counts will be missed by the simulation. Since it is always possible for a dark count to happen immediately once a pixel is reactivated, the maximum time allowable between dark count checks is equal to the amount of time a pixel must wait to be reactivated after a trigger event. This leads to the definition of the "reset group" 201 as the number of slots occurring between when a pixel triggers and when it is reactivated, pending one more fact.

The actual time to reset for each pixel is based on counting and waiting for a pre-determined number of reset events 202, or reset voltage pulses (as in a real device). The time to reset is variable over a range fixed by the detector properties. For example, any pixel that triggers must wait longer to reset than a pixel that triggers after it but before the next reset event, since they will both be reset by the same voltage pulse later on. Therefore, it is convenient to define the reset group as starting at the slot of a reset event (so any pixels triggered during that slot do not count that reset event once inactive) and ending at the slot immediately prior to the first reset event that could reactivate a pixel which triggered during the reset group. For example, if the pixels wait to see the third reset event before reactivating, the reset group would span the time between three reset events (and would include three reset events). The term "reset group" stems from the fact that it is a period of time that contains a fixed number, or group, of reset events. Since no pixel that triggers during a reset group (and hence receives a new dark count time 204*a*(iii) during a reset group) will be reactivated before the end of the reset group, it is safe to check for upcoming dark counts only at the beginning of each reset group 201*a*. The dark counts of the previous reset group's reference list may be discarded or overwritten. This is the basis for the method of looping through reset groups as a way to efficiently progress through the simulation 201 since each reset group will typically contain multiple time slots (depending on the input settings).

Similarly to the upcoming dark counts, the pixel resets occur at pre-determined time slots. Depending on the input settings, reset events 202*a* often occur only once every several slots, in which case it would be unnecessary to check for resets at every slot. A reference list of upcoming resets is compiled based on pixel triggers 204*a*(iv), so each set can be executed at the appropriate reset event 202*a* and then overwritten by the immediately ensuing triggers 204*a*(iv). This is the basis for the method of looping through reset events within each reset group 202 as an efficient way to progress through the simulation 201, since multiple time slots will typically occur between each pair of reset events.

Aside from the loop structure, the speed of the simulation is further enhanced by utilizing different detector codes based on the selected options; only the minimum amount of simulation that is required is performed. For example, an election may be made not to simulate crosstalk, in which case the simulation code used would not contain any crosstalk execution code. Furthermore, any prepared values required to perform the crosstalk simulation would not be produced. The four options that require distinct code are: 1) tracking afterpulses (although they can be simulated as dark counts without being tracked); 2) simulating crosstalk; 3) recording the location (pixel) and cause of each trigger event in separate lists;

and 4) recording firemaps, or the cumulative number of counts by pixel, at the input-specified frame rate, described in Section 10.

The code described to this point is only the most basic version, with none of the four options selected. To simulate and track afterpulses, the prepared list of times to dark count has some values replaced with the time to afterpulse (usually much shorter). A separate list is maintained telling which is which, but afterpulses are effected as if they are dark counts. When a dark count occurs, AFPCS 100 checks whether it is actually a dark count or if it is an afterpulse and records the count cause accordingly. Crosstalk is modeled as affecting the adjacent pixels (above, below, left, and right) of a triggering pixel. At each trigger event, random values are sampled to determine whether any neighbors trigger, and if so, a separate crosstalk code is launched which calls itself recursively so it can check that pixel's neighbors for crosstalk, and so forth along any chains of crosstalk triggers. Recording the location and cause of each trigger event in separate lists is a straightforward operation, but recording firemap frames is not. To record firemap frames efficiently, another layer of looping is added to the code, so that the detector simulation loops through all firemap frames, within which it loops through all reset groups within the firemap frame, and so on as before. The complication arises from the fact that the simulation is not guaranteed to fulfill and integer number of firemap frames, nor are an integer number of reset groups guaranteed to fulfill a firemap frame, so extra code is required to handle the partial loops. The non-firemap frames simulation may contain a non-integer number of reset groups, as well, so the necessity of employing code with complexity beyond that shown in FIG. 2 is present in both cases.

9. Signal Decoding (Fourth Step 104)

Once the detector simulation is complete, the master list of all counts from the detector is used for the fourth step 104, signal decoding. A signal decoder is an essential part of the overall receiver and is distinct from the detector. The simple, built-in decoder measures each received symbol at face value by itself. The received values are then compared against the intended transmitted values to directly measure the fidelity of the received message—the bottom line in system performance. If forward error correction is used, the simulation runs a decoding function and compares the result against the intended, transmitted message for a final measure of communication fidelity. The decoding function can be a sophisticated program that interprets the values of multiple received symbols together to arrive at the resulting data bits, as is done in most real communication links.

10. Simulation Outputs (Fifth Step 105)

After the time-domain simulation of the detector and the signal decoding are finished, AFPCS 100 provides several different outputs to the user. The simulation outputs range from the exact accounting of each trigger event to the number of counts resulting from each of the five trigger causes to the final measure of received message fidelity. In addition to presenting summary settings and results values in the main GUI, AFPCS 100 produces a formatted text report of the key summary values. Side-by-side with the received message fidelity are measures of the detected signal level, or the average number of counts in the intended signal time windows, and noise level, or the average number of counts per non-signal time window. Furthermore, AFPCS 100 generates a variable storing all input simulation settings, all single-valued (i.e. not a long list) numbers prepared from those settings for the purposes of the simulation, and all single-valued numbers describing the results of the simulation. Thus, a complete record of the settings is captured and can be used as a reference when interpreting the more raw data that AFPCS 100 provides after each simulation, such as the following.

AFPCS 100 displays cumulative "firemaps", which are a record of the number of counts by pixel over the course of the simulation. The number of counts is first converted to a count rate (by dividing the number of counts by the amount of time simulated) so that firemaps from simulations of different lengths can be compared directly. The firemap displays as a 3-D bar graph wherein the height of the bar over each pixel represents the count rate (the higher the bar, the higher the count rate), and each bar is color-coded according to height. Alternatively, the display may be viewed from overhead, in which case only color indicates the count rate of each pixel, but all the pixels are viewed equally. A separate firemap can be viewed for each trigger cause, or for all the noise causes together, or for all counts together. Additionally, a record of the blocked photon rate can be viewed in the same form as a firemap. The firemaps can also be viewed as percentages by pixel, such as the laser signal counts as a percentage of the total number of counts (for each pixel) or the blocked laser photons as a percentage of total laser photons. The cumulative firemap displays provide a visual interpretation of the detector activity, which, when combined with the simulation summary values, provides a thorough sense for the character of each link.

In addition to presenting the summary values and the firemaps, AFPCS 100 saves several data files resulting from the simulation. These data files include the following: 1) the master list, including cause and pixel, of all count events; 2) firemaps, including both cumulative and as recorded at a frame rate the user designates (mimicking a capability of the real detector); and 3) the final decoded data bits. These saved values are all intended to allow for further, detailed analysis of each simulated link, external to AFPCS 100.

11. Movie Production

Figure 3:
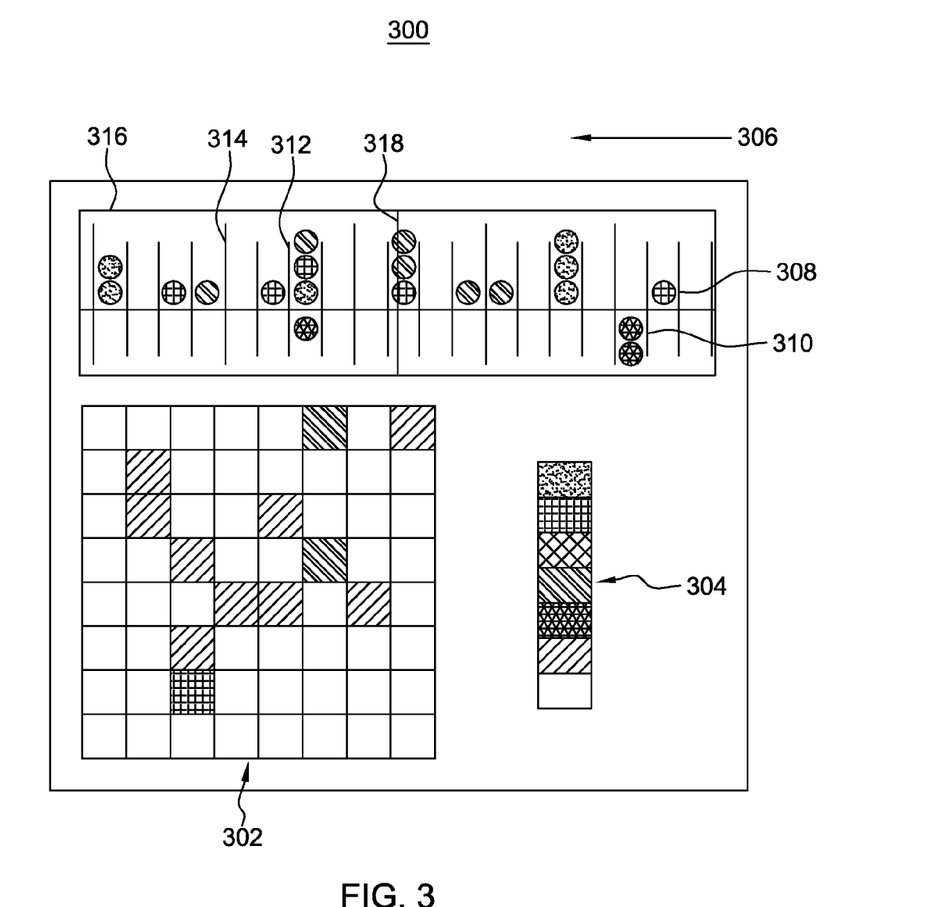
FIG. 3 is an example of a movie frame produced by running a movie of detector array activity.

Alternatively to running a simulation that produces the outputs described above, AFPCS 100 can run a simulation that produces a movie of the detector array activity. An example of a simplified movie frame 300 is shown in FIG. 3. The movie displays the pixels, as arranged in the detector array 302, changing color in time according to their status and trigger cause. Pixels display as one color when active and ready to detect light, another color at the moment of a trigger event, and they fade in time to yet another color to indicate inactive status while waiting to be reactivated (see color legend 304). A horizontally scrolling 306 timeline 316 of color-coded tokens 308, 310 representing count events 308 and failed signal counts 310 shows the combined activity of the array over multiple time slots. The number of triggers in each slot is clearly visualized by the vertical stacking of the tokens between boundaries drawn for each slot 312 and symbol 314. The timeline 316 shows both past events and future events and indicates the current display time 318, providing context to the activity shown in the array, which is synchronized with the timeline. (The timeline 316 in FIG. 3 shows pulse-position modulation with four slots making a symbol, as used in the example in Section 3.) Together, the array and timeline displays allow for the analysis of the exact detector array behavior slot by slot, contributing further to a complete understanding of the link.

Simulation for the purpose of movie production proceeds in a similar manner as described above but for a few exceptions. First, additional inputs may be gathered from the user regarding movie production settings such as frame rate, image size, the number of time slots to simulate prior to the recording (to allow the detector array to reach a steady balance of active/inactive pixels after being initialized with all pixels active), and the number of simulation time slots to render. Second, the detector code used is slightly different from that used during normal simulation. The main difference is that unlike the normal code, the movie detector code records the status of the entire array at each time slot, for the movie is rendered after the completion of the simulation. Last, during movie production, no signal decoding takes place, and no statistical measurements of detector activity are made. When a movie is produced and saved, a description file containing all the settings used for the movie is produced and saved.

12. Exemplary Embodiments

Figure 4:
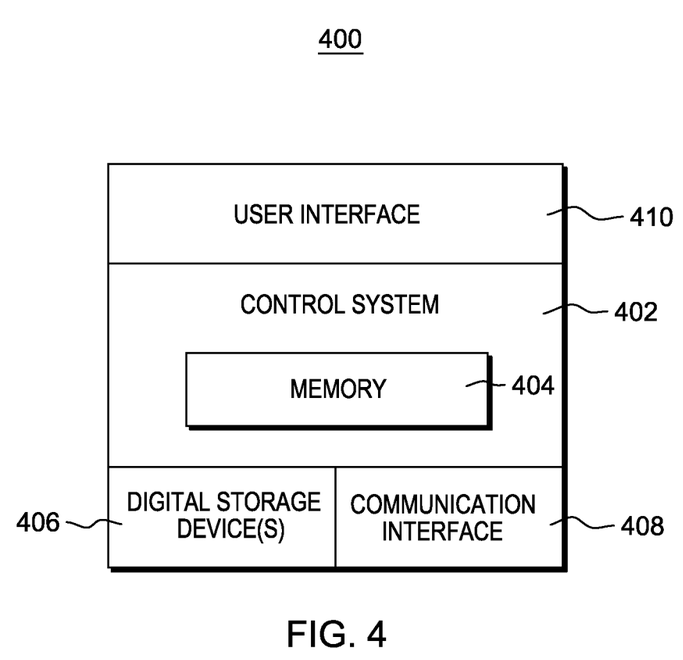
FIG. 4 is a block diagram of the central server according to one embodiment of the present disclosure.

In addition to the embodiments discussed above, FIG. 4 illustrates a block diagram of a central server 400 upon which the AFPCS 100 may reside according to one embodiment of the present disclosure. As discussed, AFPCS 100 may be implemented using MATLAB® operating on the central server 400. In general, the central server 400 includes a control system 402 having associated memory 404. The control system 402 is a processor, Application Specific Integrated Circuit (ASIC), Field Programmable Gate Array (FPGA) or similar hardware providing processing capabilities. In this disclosure the AFPCS 100 is implemented in software and stored in the memory 404 for execution by the control system 402. However, the embodiments of the AFPCS 100 are not limited thereto. The AFPCS 100 may be implemented in a software, hardware or combination thereof. The memory 404 may be (but is not limited to) a non-transitory computer readable medium comprising all computer readable media except for transitory, propagating signals. The computer readable medium stores a data storage program (e.g., MATLAB@) causing the control system 402 to execute a process. The memory 404 is readable by the control system 402 and may include a magnetic recording medium, an optical disk, integrated circuit(s) or the like. Data storage in the server 400 may also include computer readable media which store data for short time periods such as a register memory, processor cache and random access memory (RAM). In addition, server 400 herein may include additional removable computer readable media for data storage which may be read by the control system 402 such as a digital storage device 406 (e.g., flash drive). The central server 400 may also include a communication interface 408 which can communicatively couple the central server 400 to a network (e.g., LAN, Internet). The central server 400 may also include a user interface 410 which may include components such as a display, one or more input devices, a GUI, or the like. In alternative embodiments, the AFPCS could be stored remotely on a server in a cloud/networking environment and interact with the control system 402 in that manner.

An aspect the AFPCS embodiments described in this disclosure are that they provide an exact accounting of the influence of the communication signal and of each source of noise on system performance. One of the features that allows for this is the explicit time slot by time slot simulation of the detector under user-defined conditions. The program interface is designed to allow for ease in setting the desired conditions and communication system settings so that the detector and communication system performance may be measured in as comprehensive a context as desired within the constraint of static link conditions. Another aspect of the AFPCS embodiments disclosed herein is that they provide valuable insight into a photon counting communication system's inner workings (by measuring more than is possible in a real communication link) and thereby enabling more detailed link evaluation when simulated results are compared against real results. This knowledge of the communication system's inner workings should lead to better design of real (physical) photon-counting communication links by allowing for testing of new link concepts and providing a detailed link analysis revealing each communication system's settings influence on the overall system performance.

The embodiments disclosed herein are designed as a simulation for photon-counting detectors based on arrays of Geiger-mode avalanche photodiodes, but the wide flexibility in detector characteristics may allow for simulations of other photon-counting detectors. For example, a super-conducting nanowire photon-counting detector could be simulated, although the gradual restoration of detection efficiency of such a device after a count event would only be approximately modeled by the delayed but instantaneous recovery of a pixel in the AFPCS.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not imply that the illustrated process or any of its steps are necessary to the embodiment(s), and does not imply that the illustrated process is preferred.

It is to be understood that the preceding is merely a detailed description of an apparatus and method of the present invention, and that numerous changes to the disclosed apparatus and method can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. A method for analyzing a communications link comprising:

receiving a plurality of input conditions for the communications link and a photon-counting detector;

preparing stimulus values for the photon-counting detector;

running a simulation of the communications link and the photon-counting detector in reaction to the stimulus values;

looping through reset groups; therein looping through reset events that occur during each of the reset groups; therein looping through slots that occur between the reset events; therein looping through trigger events in each of the slots;

decoding the results of the simulation and preparing an analysis of the photon-counting detector activity; and outputting the analysis of the photon-counting detector activity.

* * * * *